United States Patent [11] 3,575,616

| [72] | Inventor | Harley D. Jordan<br>South Daytona, Fla. |
|---|---|---|
| [21] | Appl. No. | 788,268 |
| [22] | Filed | Dec. 31, 1968 |
| [45] | Patented | Apr. 20, 1971 |
| [73] | Assignee | General Electric Company |

[54] SIGNAL CONDITIONER
3 Claims, 2 Drawing Figs.

[52] U.S. Cl. .................................................. 307/260,
235/189, 307/232, 307/251, 307/309, 324/34,
328/1, 328/133, 340/199
[51] Int. Cl. ...................................................... H03k 5/00
[50] Field of Search .......................................... 307/260,
261, 262, 251, 309, 295, 232; 328/1, 155, 133;
235/189; 340/199; 324/34 (Positive)

[56] References Cited
UNITED STATES PATENTS

| 3,181,072 | 4/1965 | Granqvist ..................... | 307/232X |
| 3,465,256 | 9/1969 | Moses ......................... | 328/133 |
| 3,479,867 | 11/1969 | Tarpinian et al. .............. | 328/1X |
| 3,495,078 | 2/1970 | James et al. ................. | 328/133X |
| 3,509,469 | 4/1970 | Strange ....................... | 328/133X |

Primary Examiner—Stanley T. Krawczewicz
Attorneys—Raymond H. Quist, Allen E. Amgott, Henry W. Kaufmann, Melvin M. Goldenberg, Frank L. Neuhauser and Oscar B. Waddell ABSTRACT: A signal from a synchro-type transducer having rotor angular position information in the second harmonic is applied to a signal conditioning circuit. A resistive summing network is used to add, and difference amplifiers to subtract, components of the currents. The currents are gated to the difference amplifiers at double the fundamental frequency resulting in DC voltage levels proportional to the mechanical orientation of the rotor.

INVENTOR.
Harley D. Jordan

SIGNAL CONDITIONER

BACKGROUND OF THE INVENTION

This invention relates generally to synchro-type devices, and more particularly to a signal conditioning circuit for producing DC voltages proportional to the synchro rotor angular position.

Synchro-type devices are employed to provide a remote indication of the angular position of a rotor which generally is moved by some outside mechanical means. A typical example is the mass flowmeter described in U.S. Pat. No. 2,714,310. As shown in that patent, the signals produced by the transducer are conventionally carried by four wires to a remote readout device.

In some more modern aircraft, the number of transducers of various types which are employed has become large enough so that the weight of separate conductors to carry information from the transducers to a central location is prohibitive. Instead, information from a number of transducers in a particular area of the aircraft is encoded in some manner in that area, multiplexed and sent over one or two wires to the central location.

It is an object of this invention to derive from the signals produced by a synchro-type transducer, DC voltages representing the angular position of the synchro rotor. These voltages can be encoded and multiplexed by conventional means.

SUMMARY OF THE INVENTION

The four alternating current signals coming from the synchro are added by a resistive summing network with appropriate scaling factors introduced in accordance with a formula. The four resulting signals are gated at the frequency of the second harmonic so that the alternate quarter cycles (of the fundamental) are applied to a pair of difference amplifiers after being filtered to produce DC voltage levels. The difference amplifiers perform subtractions in accordance with the formula and produce voltages proportional to the sine and cosine of the mechanical angle of the rotor.

DESCRIPTION OF THE PREFERRED EMBODIMENT

Figure 1:
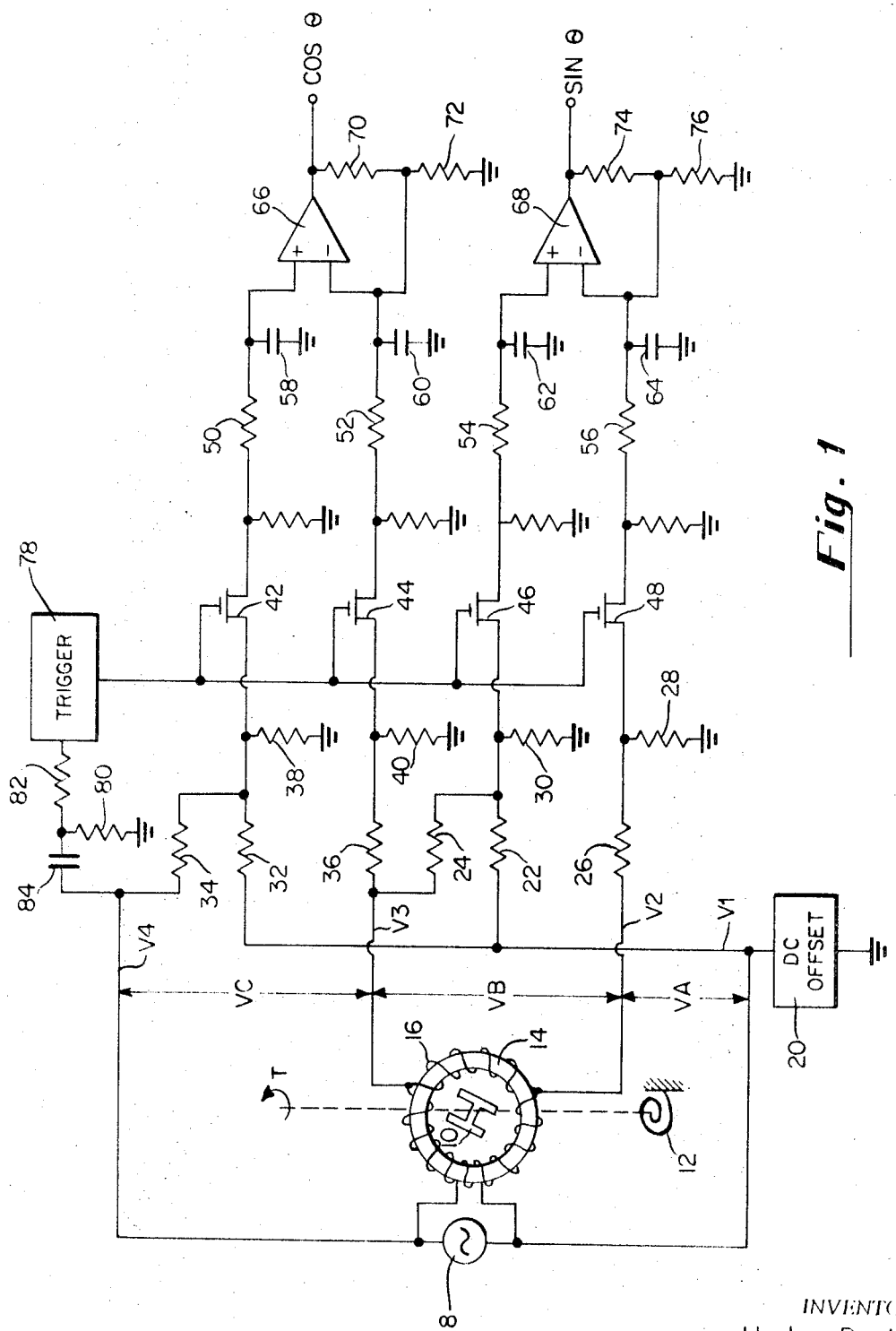
FIG. 1 is a schematic circuit diagram of one embodiment of the signal conditioner of this invention.

As illustrated in FIG. 1, a permanent magnet rotor 10 takes an angular position determined by the application of a torque $T$ (such as that produced by the turbine of a mass flowmeter), and the resistance of restraining spring 12. Toroidal core 14 surrounds rotor 10 and is wound with coil 16. Coil 16 is excited with an alternating current (typically 400 Hz.) from source 18.

Coil 16 is divided into three equal parts so that without rotor 10 the voltage from source 18 would be divided into thirds; i.e., $VA=VB=VC$. Depending on the position of permanent magnet rotor 10, portions of core 14 are caused to approach saturation. This effect, together with hysteresis, results in the generation of harmonics, the amplitudes of which are sinusoidal functions of the angular position of rotor 10. Each of the voltages $VA$, $VB$, and $VC$ consequently contains harmonic components in addition to the fundamental (e.g., $VA=\frac{1}{3}VF+Va$). It should be noted that similar voltages are developed by synchro-type devices so that this invention can also be used for these transducers.

Before proceeding with the description of how the angular position information contained in the harmonics is extracted, an examination of the voltages involved will be made. Voltage $V1$ in the theoretical case would be zero or ground; however, in a practical system some difference (represented here by "DC OFFSET" 20) would exist between the ground of the transducer and that of the circuitry of the signal conditioner still to be described.

Voltage $V2$ can be said to have a magnitude equal to the sum of $V1$, $\frac{1}{3}VF$ (the fundamental supply voltage), and $Va$ (the harmonic content), or:

$$V2=V1+\tfrac{1}{3}VF+Va.$$

Similarly, voltage $V3$ has an amplitude equal to the sum of $V1$, $\frac{2}{3}VF$, $Va$, and $Vb$ (the harmonic component), or:

$$V3=V1+\tfrac{2}{3}VF+Va+Vb.$$

$Va$ and $Vb$ vary sinusoidally with the angle of rotor 10 of the transducer as well as with time. Voltage $V4$ is seen to have an amplitude equal to the sum of $V1$, $VF$, $Va$, $Vb$ and $Vc$ (the harmonic component). However, since the sum of $Va$, $Vb$ and $Vc$ is zero, $V4$ can be expressed as:

$$V4=VF+V1.$$

Sinusoidal of $\Theta$, the angle of rotor 10, can be derived from the sum and difference of $Va$ and $Vb$. These functions will be 90° apart in mechanical phase and have a known relationship to the orientation of rotor 10. Expressed mathematically:

$$\sin\Theta=C1\,(Vb-Va)$$

$$\cos\Theta=C2\,(Vb+Va)$$

where $C1$ and $C2$ are scaling factors. Substituting for $Va$ and $Vb$ the equivalents previously recited, it is found:

$$\sin\Theta=C1\,(V3+V1-2\,V2)$$

$$\cos\Theta=C2\,[V3-\tfrac{1}{2}(V1+2\,V4)].$$

Having mathematically shown the functions desired, the implementation will now be described. By combining particular currents through appropriate resistive summing networks, the adding of the voltages in accordance with the formulas can be accomplished. As will be shown, differential amplifiers are utilized to make the necessary subtractions. In performing the summing for the sine function, resistors 22 and 24 of equal magnitude are introduced to reduce the voltages to a more easily worked with value. Resistor 26 of half the magnitude of resistors 22 and 24 is used to provide the coefficient 2 associated with voltage $V2$. The scale factor $C1$ is introduced by resistors 28 and 30 of equal magnitudes.

In a similar manner, the summing for the cosine function is performed. Resistor 32 is provided to introduce voltage $V1$ at a convenient level. Resistor 34 of half the magnitude of resistor 32 provides the coefficient 2 associated with voltage $V4$. Finally, resistor 36 is inserted in the line carrying voltage $V3$. Resistors 38 and 40 provide the necessary scaling factor $C2$.

Figure 2:
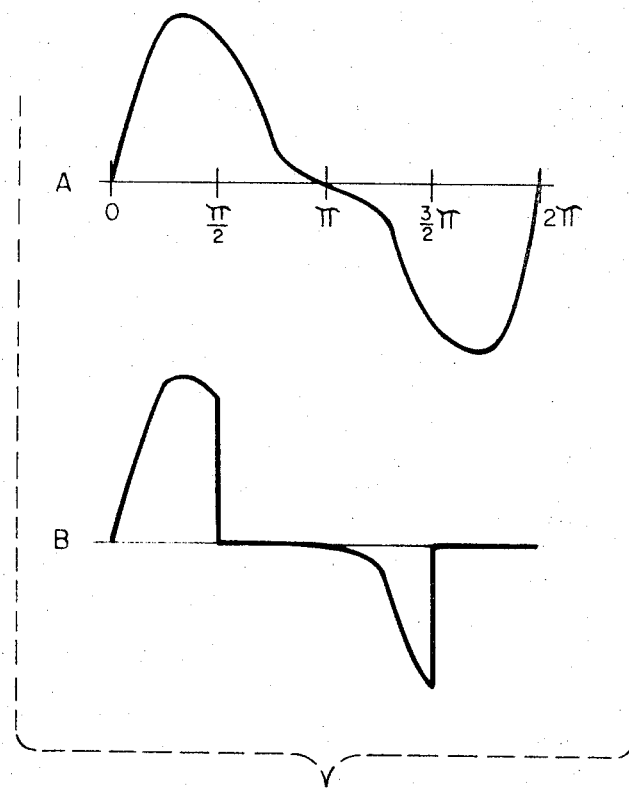
FIG. 2 illustrates waveforms of signals in the circuit.

As was previously mentioned, in addition to the fundamental 400 Hz. frequency, harmonics are present in the waveforms of the signals. Depending upon the phase relationship of the harmonics and the fundamental, some distortion of the fundamental is produced. Considering the voltages $V2$, $V3$, and $V4$, the distortions will have equal phase displacement in time, and be of such amplitude that if they were added graphically only the fundamental sine wave would remain. Typical of the type of distortion referred to is that illustrated in FIG. 2A. This reflects the combination of the fundamental and primarily the second harmonic. It can be seen that, with this particular combination, the positive and negative half cycles are mirror images so that if they were filtered a zero voltage level would be produced. If, however, only the first and third quarter cycles were considered such as in FIG. 2B, the filter would produce a DC voltage level other than zero.

By providing field effect transistors 42 through 48, and gating these at 800 Hz. the alternate quarter cycles can be extracted in each of the four legs of the circuit. Adding filters comprising resistors 50 through 56, and capacitors 58 through 64, to each of the four legs results in a direct current voltage level in each leg.

These voltage levels are applied to difference amplifiers 66 and 68 to perform the subtractions previously referred to. Feedback circuits comprising resistors 70 and 72 associated with difference amplifier 66, and resistors 74 and 76 associated with difference amplifier 68 are added to control the gain of these amplifiers.

The voltages derived from difference amplifiers 66 and 68 represent the sine and cosine of the angle of rotor 10 relative to some origin. These voltages can be transmitted directly, or digitized and multiplexed with signals from other transducers.

It will be recalled, field effect transistors 42 through 48 are gated at 800 Hz. Trigger 78 produces the necessary square wave output at this frequency in the manner described in my copending application entitled "Frequency Doubler" when supplied with the fundamental 400 Hz. frequency. Resistors 80 and 82, and capacitor 84 act as a voltage divider and provide reactance sufficient to align the phases of the square wave with those of the second harmonic to achieve the output shown in FIG. 2B.

I claim:

1. In combination with a synchro-type transducer which produces alternating signals containing synchro rotor positional information in the second harmonic, a signal conditioning circuit comprising:
    a resistive summing network connected to said synchro-type transducer for adding said alternating signals;
    gating means connected to said summing network for gating the added signals at the frequency of the second harmonic so that only alternate half cycles of the second harmonic are passed;
    filter means connected to receive said gated signals and convert them to DC voltage levels; and
    means connected to said filter means for producing signals representing the difference between pairs of the resulting DC voltage levels.

2. In combination with a synchro-type transducer excited by an alternating current at a fundamental frequency and having four alternating signal outputs, $V1$ the fundamental, and $V2$, $V3$, and $V4$, containing second harmonics the amplitude of which depend upon the angular position of the synchro rotor, the improvement of a signal conditioner for producing DC voltage levels proportional to the sine and cosine of the angular position of the rotor such that $\sin\Theta = C1\ (V3+V1-2V2)$ and $\cos\Theta = C2[V3-\frac{1}{3}(V1+2V4)]$ where $\Theta$ is the angle of the rotor and $C1$ and $C2$ are scaling factors comprising;
    a resistive summing network connected to said synchro-type transducer for performing the additions of said alternating signal outputs and applying the scaling factors;
    gating means connected to said summing network for gating the added signals at the frequency of the second harmonic so that only alternate half cycles of the second harmonic are passed;
    filter means connected to receive said gated signals and convert them to DC voltage levels; and
    difference amplifiers connected to said filter means to perform the subtractions.

3. A signal conditioner in accordance with claim 2 wherein:
    said gating means includes field effect transistors connected between said resistive summing network and said filter means.